US012671097B2

(12) United States Patent     (10) Patent No.:   US 12,671,097 B2

Watanabe et al.       (45) Date of Patent:    Jun. 30, 2026

(54) GAS DIFFUSION MEMBER, GAS DIFFUSION UNIT, AND FUEL CELL

(71) Applicants: UNIVERSITY OF YAMANASHI, Kofu (JP); ENOMOTO CO., LTD., Uenohara (JP)

(72) Inventors: Masahiro Watanabe, Kofu (JP); Hiroshi Yanai, Uenohara (JP); Mitsunori Nasu, Uenohara (JP); Yohei Horiuchi, Uenohara (JP)

(73) Assignees: UNIVERSITY OF YAMANASHI, Kofu (JP); ENOMOTO CO., LTD., Uenohara (JP)

( * ) Notice: Subject to any disclaimer, the term of this patent is extended or adjusted under 35 U.S.C. 154(b) by 514 days.

(21) Appl. No.: 17/795,323

(22) PCT Filed: Jan. 7, 2021

(86) PCT No.: PCT/JP2021/000352

§ 371 (c)(1),
(2) Date: Jul. 26, 2022

(87) PCT Pub. No.: WO2021/171793

PCT Pub. Date: Sep. 2, 2021

(65) Prior Publication Data

US 2023/0147601 A1     May 11, 2023

(30) Foreign Application Priority Data

Feb. 25, 2020    (JP) ................................. 2020-029063

(51) Int. Cl.
H01M 8/0245     (2016.01)
H01M 4/86      (2006.01)
(Continued)

(52) U.S. Cl.
CPC ........... H01M 8/0245 (2013.01); H01M 4/86 (2013.01); H01M 8/0239 (2013.01); H01M 8/026 (2013.01); H01M 8/0276 (2013.01)

(58) Field of Classification Search
CPC .... H01M 8/0245; H01M 4/86; H01M 8/0239; H01M 8/026; H01M 8/0276;
(Continued)

(56) References Cited

U.S. PATENT DOCUMENTS

2004/0126631 A1*   7/2004   Uchida ................... H01M 4/92
                                                429/492
2004/0157112 A1    8/2004   Suzuki et al.
(Continued)

FOREIGN PATENT DOCUMENTS

CN        1551392 A    12/2004
CN        1954450 A    4/2007
(Continued)

OTHER PUBLICATIONS

Extended Search Report issued on Dec. 7, 2023, in corresponding European Application No. 21760887.6, 7 pages.
(Continued)

*Primary Examiner* — Helen Oi K Conley
(74) *Attorney, Agent, or Firm* — Maier & Maier, PLLC

(57) ABSTRACT

A gas diffusion member which can reduce internal resistance of a fuel cell. A gas diffusion member arranged between a separator and a catalyst layer of a fuel cell, including: a porous material layer; and a conductive material layer; wherein: the porous material layer is formed of a conductive porous material; the conductive material layer is formed of a conductive material; and the conductive material layer is arranged on a surface of the porous material layer on a side of the separator and is provided so that pores of the porous material layer are filled with the conductive material.

8 Claims, 9 Drawing Sheets

(51) Int. Cl.

| | |
|---|---|
| *H01M 8/0239* | (2016.01) |
| *H01M 8/026* | (2016.01) |
| *H01M 8/0276* | (2016.01) |

(58) Field of Classification Search

CPC ............. H01M 4/8652; H01M 4/8657; H01M 2008/1095; H01M 8/0243; H01M 4/8605; H01M 8/0228; Y02E 60/50

See application file for complete search history.

(56) References Cited

U.S. PATENT DOCUMENTS

| | | | |
|---|---|---|---|
| 2004/0170880 A1 | 9/2004 | Nagoshi et al. | |
| 2004/0247992 A1 | 12/2004 | Kabumoto et al. | |
| 2005/0123819 A1 | 6/2005 | Hiroi et al. | |
| 2005/0238932 A1* | 10/2005 | Koyama | H01M 8/1023 |
| | | | 429/513 |
| 2007/0231689 A1 | 10/2007 | Zuber et al. | |
| 2011/0236792 A1 | 9/2011 | Kawashima et al. | |
| 2011/0244358 A1 | 10/2011 | Yamauchi et al. | |
| 2017/0162878 A1 | 6/2017 | Imura et al. | |
| 2017/0179498 A1 | 6/2017 | Shoji et al. | |
| 2019/0067709 A1* | 2/2019 | Nobata | H01M 8/0228 |

FOREIGN PATENT DOCUMENTS

| | | | | |
|---|---|---|---|---|
| CN | 106716695 | A | | 5/2017 |
| JP | 2002-100372 | A | | 4/2002 |
| JP | 2004139829 | A | | 5/2004 |
| JP | 2004-185905 | | * | 7/2004 |
| JP | 2005-056583 | | * | 3/2005 |
| JP | 2006032188 | A | | 2/2006 |
| JP | 2006-134640 | A | | 5/2006 |
| JP | 2009170273 | A | | 7/2009 |
| JP | 2009224279 | A | | 10/2009 |
| JP | 2011-233537 | A | | 11/2011 |
| JP | 2015-195111 | A | | 11/2015 |
| WO | 2019239605 | A1 | | 12/2019 |

OTHER PUBLICATIONS

International Search Report mailed on Mar. 9, 2021, in corresponding to International Application No. PCT/JP2021/000352; 5 pages (with English Translation).

Office Action issued on Jan. 17, 2025, in corresponding Chinese Application No. 202180014644.4, 13 pages.

Office Action issued on Oct. 23, 2025, in corresponding Chinese Application No. 202180014644.4, 15 pages.

* cited by examiner

Fig. 5

GAS DIFFUSION MEMBER, GAS DIFFUSION UNIT, AND FUEL CELL

FIELD

The present invention relates to a gas diffusion member, a gas diffusion unit, and a fuel cell.

BACKGROUND

As disclosed in Patent Literatures 1 and 2, a fuel cell can generate electricity through electrochemical reaction by supplying hydrogen to an anode and air (oxygen) to a cathode.

PRIOR ART DOCUMENTS

Patent Literature

[Patent Literature 1] WO 2019/239605
[Patent Literature 2] WO 2019/239605

SUMMARY

Technical Problem

A fuel cell has internal resistance. Since power generation efficiency is lowered as the internal resistance becomes higher, it is desired to reduce the internal resistance.

The present invention has been made by taking these circumstances into consideration. The present invention provides a gas diffusion member capable of reducing internal resistance of a fuel cell.

Means to Solve the Problem

According to the present invention, a gas diffusion member arranged between a separator and a catalyst layer of a fuel cell, comprising:
a porous material layer; and
a conductive material layer; wherein:
the porous material layer is formed of a conductive porous material;
the conductive material layer is formed of a conductive material; and
the conductive material layer is arranged on a surface of the porous material layer on a side of the separator and
is provided so that pores of the porous material are filled with the conductive material, is provided.

The present inventors have found that since the porous material layer of the gas diffusion member is porous, contact resistance between the porous material layer and the separator is high. Based on the finding, they have found that the contact resistance between the porous material layer and the separator can be reduced by providing the conductive material layer so that the pores of the porous material layer on the side of the separator are filled with the conductive material, and consequently the internal resistance can be reduced, thereby leading to completion of the invention.

The following are examples of various embodiments of the present invention. The embodiments shown below can be combined with each other.

Preferably, the gas diffusion member, wherein the porous material layer comprises a groove on the surface of the porous material layer on the side of the separator as a gas flow path.

Preferably, the gas diffusion member, wherein a microporous layer is provided on the surface of the porous material layer on the side of the catalyst layer.

Preferably, the gas diffusion member, wherein the conductive material is formed of a resin in which conductive particles are dispersed.

Preferably, the gas diffusion member, wherein a thickness of the conductive material layer is 1 to 100 μm.

Preferably, the gas diffusion unit comprising the gas diffusion member and the separator, wherein the gas diffusion member is adhered to the separator via the conductive material.

Preferably, the gas diffusion unit, wherein a gasket arranged to surround the gas diffusion member is fixed to the separator.

Preferably, a fuel cell comprising a cathode-side separator, a cathode gas diffusion member, a catalyst-coated membrane, an anode gas diffusion member and an anode-side separator in this order, wherein: the catalyst-coated membrane comprises a cathode catalyst layer, an electrolyte membrane and an anode catalyst layer in order from a side of the cathode gas diffusion member; and the cathode gas diffusion member and the anode gas diffusion member are each the gas diffusion member.

Preferably, the fuel cell, wherein: the cathode gas diffusion member is adhered to the cathode-side separator; and the anode gas diffusion member is adhered to the anode-side separator.

Preferably, the fuel cell, wherein: a cathode gasket arranged to surround the cathode gas diffusion member is fixed to the cathode-side separator; and an anode gasket arranged to surround the anode gas diffusion member is fixed to the anode-side separator.

BRIEF DESCRIPTION OF THE DRAWINGS

FIG. 5 is a perspective view of a gasket 13 and a cooling water diffusion member 33 as viewed from diagonally above.

DETAILED DESCRIPTION

Hereinafter, embodiments of the present invention will be explained with reference to the drawings. Various distinctive features shown in the following embodiments can be combined with each other. In addition, an invention can be established independently for each of the distinctive features.

1. First Embodiment

Figure 1:
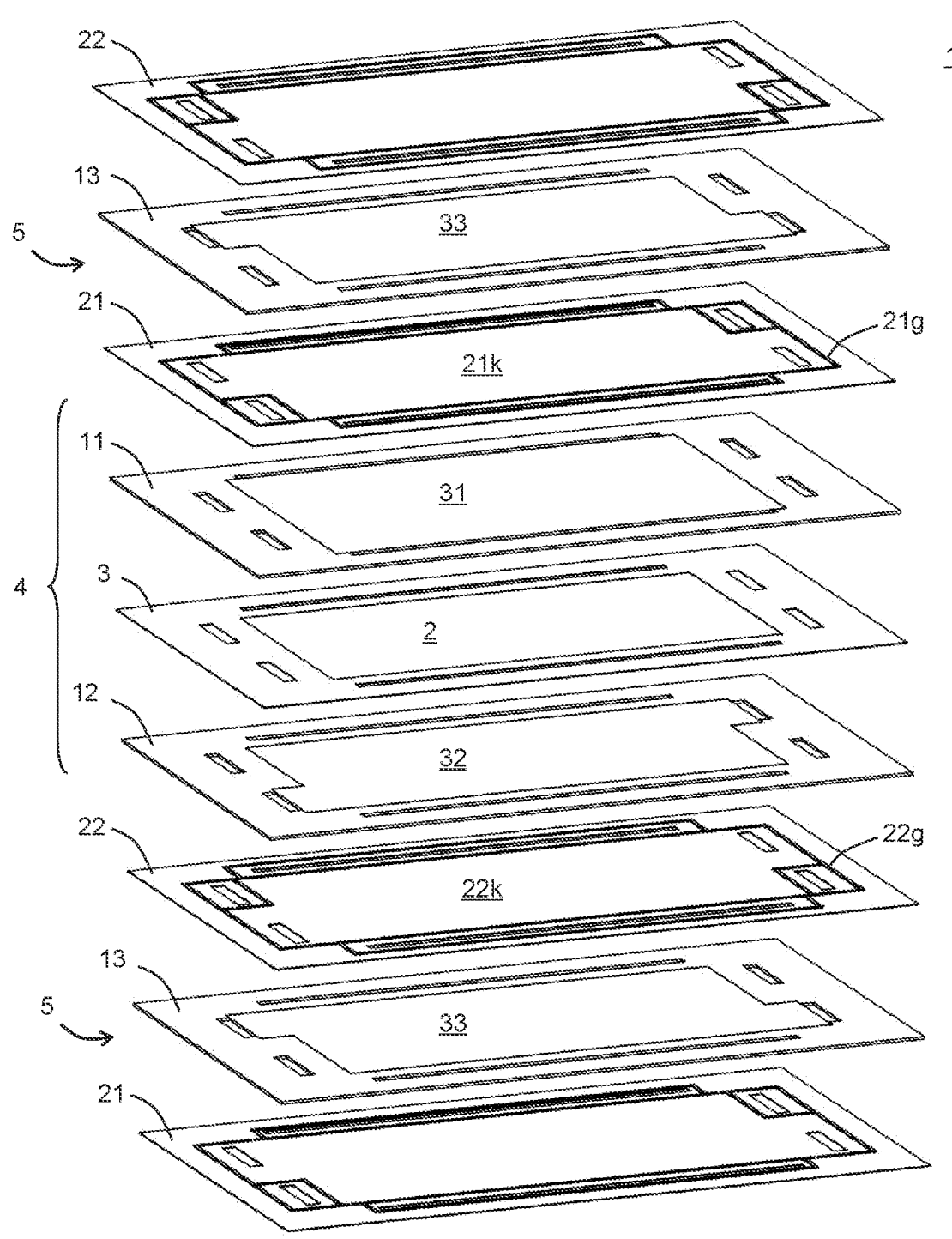
FIG. 1 is an exploded perspective view of a fuel cell 1 of the first embodiment of the present invention as viewed from diagonally above.
Figure 2:
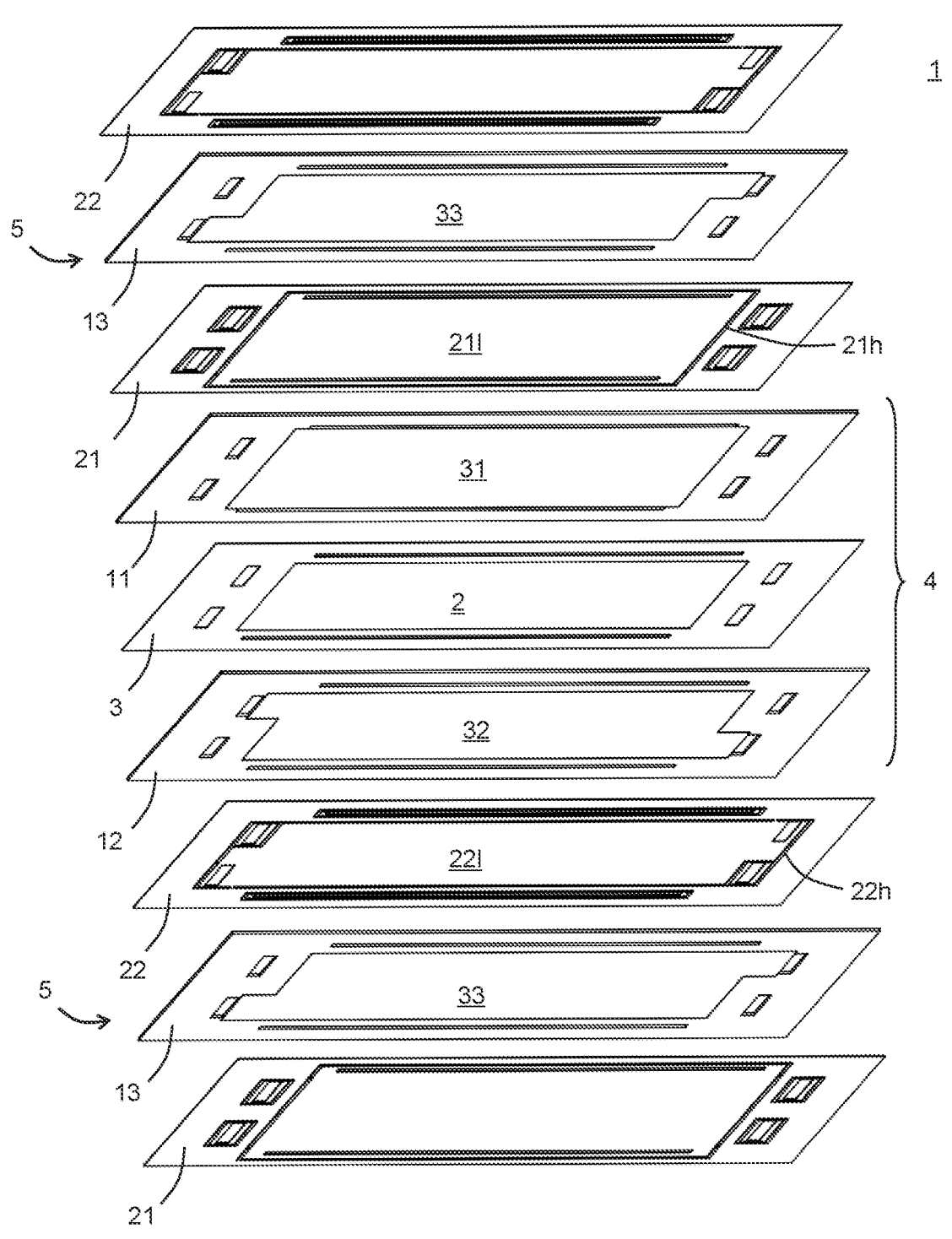
FIG. 2 is an exploded perspective view of the fuel cell 1 of FIG. 1 as viewed from diagonally below.

As shown in FIGS. 1 and 2, the fuel cell 1 of the first embodiment of the present invention comprises a catalyst-coated membrane 2, a support frame 3, a cathode gasket 11, an anode gasket 12, a cooling water gasket 13, a cooling water/cathode separator (an example of a "cathode-side separator") 21, and an anode/cooling water separator (an example of an "anode-side separator) 22, a cathode gas diffusion member 31, an anode gas diffusion member 32, and a cooling water diffusion member 33. Therefore, the fuel cell 1 comprises the cooling water/cathode separator 21, the cathode gas diffusion member 31, the catalyst-coated membrane 2, the anode gas diffusion member 32, and the anode/cooling water separator 22 in this order.

A single cell 4 is configured of the catalyst-coated membrane 2, the support frame 3, the gaskets 11 and 12, and the gas diffusion members 31 and 32. The gasket 13 and the diffusion member 33 constitute a cooling layer 5. The cooling layer 5 is arranged above and below the single cell 4, and the single cell 4 is separated from the upper and lower cooling layers 5 by the separators 21 and 22. The single cell 4, the separator 21, the cooling layer 5, and the separator 22 constitute a repeating unit. By stacking the required number of these repeating units, a stacked cell having the desired performance is obtained. A current collector, insulating sheet, and end plate (not shown) can be placed on the upper and lower surface of the stacked cell. By pressing each member from both sides using a pair of end plates, the members in the electrochemical stacked cell can be tightly bonded to each other.

As shown in FIGS. 3 to 8, the support frame 3, the gaskets 11, 12, 13, and the separators 21, 22 are provided with cathode gas inlets 3a, 11a, 12a, 13a, 21a, 22a (hereinafter referred to as "cathode gas inlets 3a etc.") and cathode gas outlets 3b, 11b, 12b, 13b, 21b, 22b (hereinafter referred to as "cathode gas outlets 3b etc.") as a flow port (inlet or outlet) of the cathode gas such as air and oxygen; anode gas inlets 3c, 11c, 12c, 13c, 21c, 22c (hereinafter referred to as "anode gas inlets 3c etc.") and anode gas outlets 3d, 11d, 12d, 13d, 21d, 22d (hereinafter referred to as "anode gas outlets 3d etc.") as a flow port of the anode gas such as hydrogen; and cooling water inlets 3e, 11e, 12e, 13e, 21e, 22e (hereinafter referred to as "cooling water inlets 3e etc.") and cooling water outlets 3f, 11f, 12f, 13f, 21f, 22f (hereinafter referred to as "cooling water outlets 3f etc.") as a flow port of the cooling water (an example of "fluid"), respectively. The cathode gas inlets 3a etc., the cathode gas outlets 3b etc., the anode gas inlets 3c etc., the anode gas outlets 3d etc., the cooling water inlets 3e etc., and the cooling water outlets 3f etc., are each communicated with each other.

Hereinafter, each configuration will be described in detail.

Figure 3A:
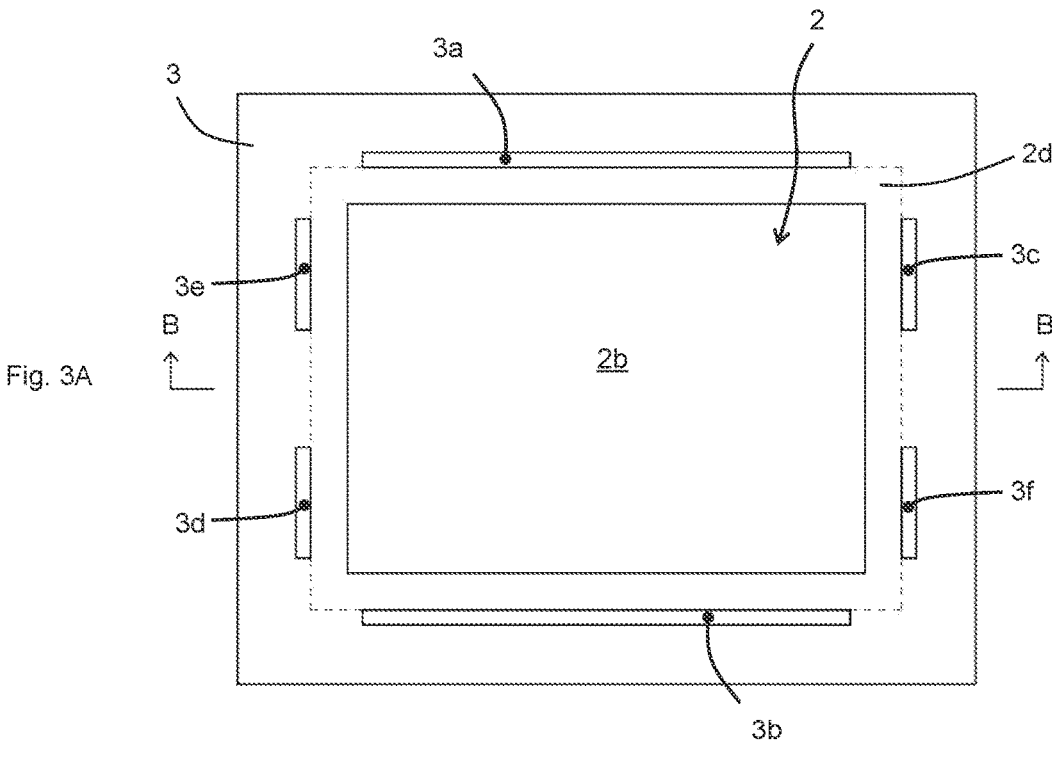
FIG. 3A is a plan view of a catalyst-coated membrane 2 and a support frame 3.
Figure 3B:
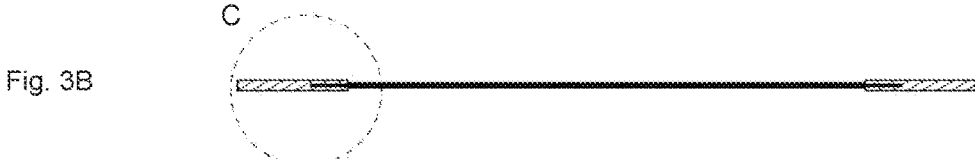
FIG. 3B is a cross-sectional view along a B-B line in FIG. 3A.
Figure 3C:
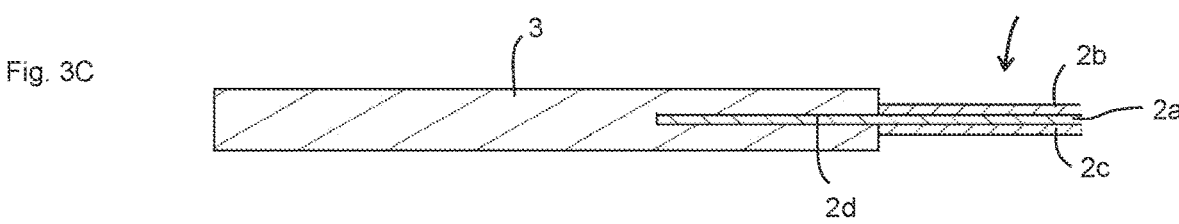
FIG. 3C is an enlarged view of an area C in FIG. 3B.

As shown in FIG. 3, the catalyst-coated membrane 2 is configured by applying a cathode catalyst layer 2b to one surface of an electrolyte membrane 2a and applying an anode catalyst layer 2c to the other surface of the electrolyte membrane 2a. Therefore, the catalyst-coated membrane 2 has, in order from the cathode gas diffusion member 31 side, the cathode catalyst layer 2b, the electrolyte membrane 2a, and the anode catalyst layer 2c. The periphery 2d of the catalyst-coated membrane 2 is supported by the support frame 3.

Figure 5:
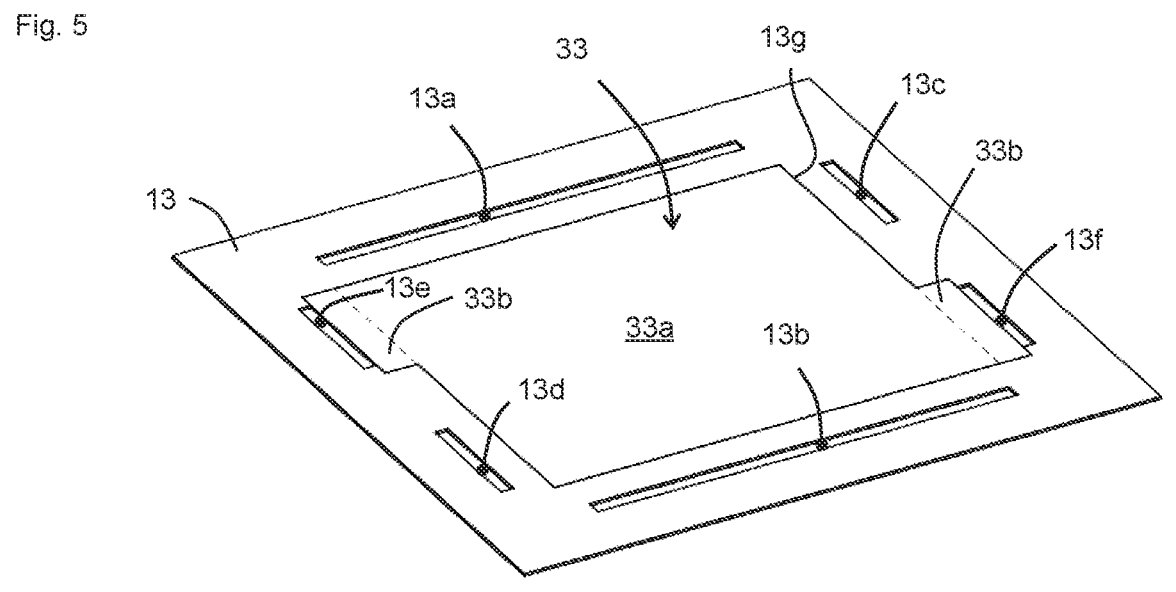

As shown in FIGS. 4 to 5, the gaskets 11, 12, 13 are, for example, sheets formed of an elastic material such as rubber and are provided with accommodating part 11g, 12g, 13g to accommodate the diffusion members 31, 32, 33, respectively. Therefore, the gaskets 11, 12, 13 are arranged to surround the diffusion members 31, 32, 33, respectively.

Figures 4A, 4B, 4C:
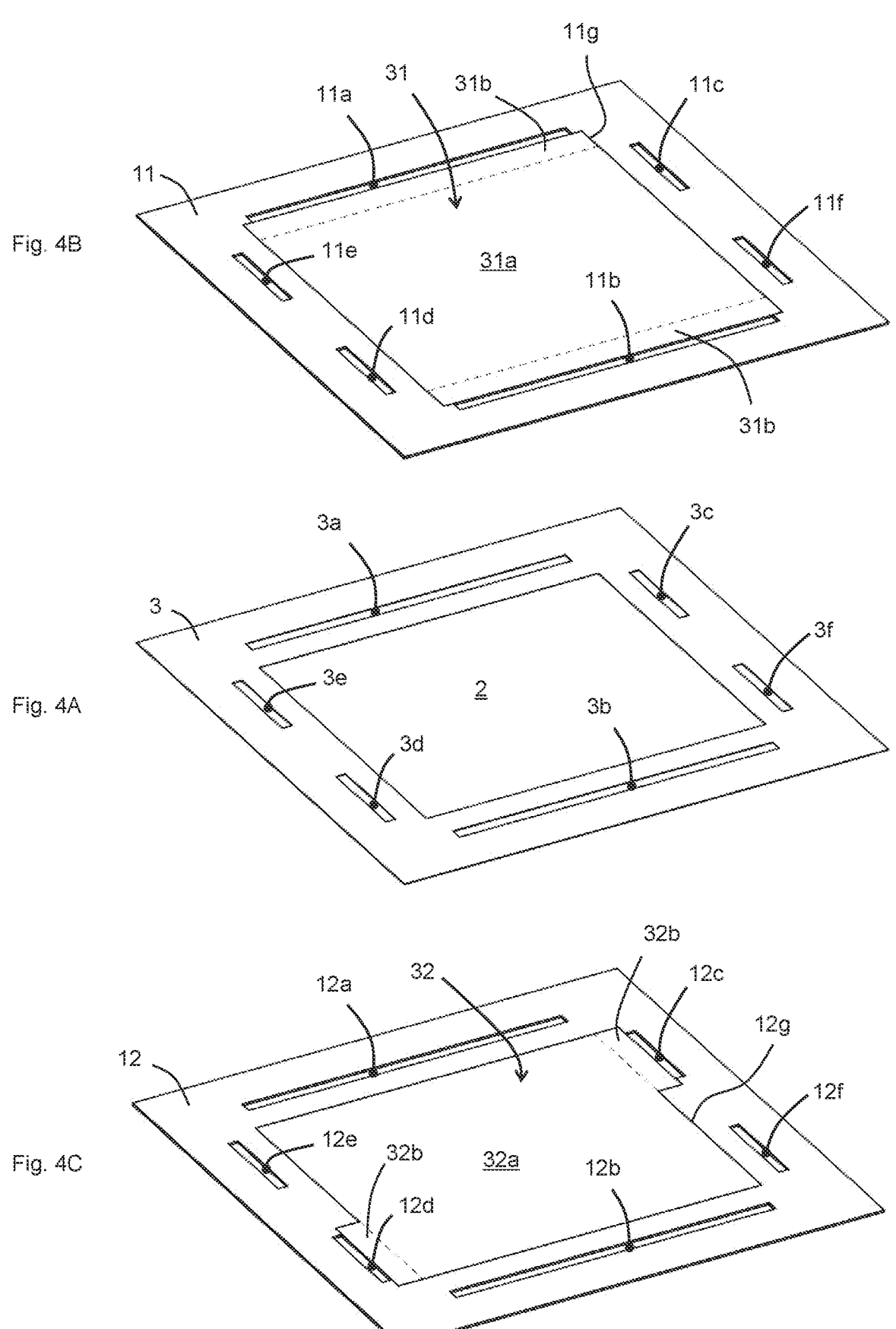
FIG. 4A is a perspective view of the catalyst-coated membrane 2 and the support frame 3 as viewed from diagonally above.
FIG. 4B is a perspective view of a gasket 11 and a cathode gas diffusion member 31 as viewed from diagonally above.
FIG. 4C is a perspective view of a gasket 12 and an anode gas diffusion member 32 as viewed from diagonally above.

As shown in FIG. 4B, the accommodating part 11g is communicated with the cathode gas inlet 11a and the cathode gas outlet 11b. The accommodating part 11g accommodates the gas diffusion member 31, thereby easily positioning the gas diffusion member 31. The gas diffusion member 31 diffuses the cathode gas supplied from the cathode gas inlet 11a. The gas diffusion member 31 has an overlapping part 31a which overlaps the catalyst layers 2b, 2c in a plan view, and a protruding part 31b which protrudes from the overlapping part 31a towards the cathode gas inlet 11a and cathode gas outlet 11b. According to this configuration, the cathode gas supplied from the cathode gas inlet 11a is smoothly introduced into the gas diffusion member 31. The value of (the thickness of the gas diffusion member 31/the thickness of the gasket 11) is, for example, 0.8 to 1.2, and preferably 0.9 to 1.1.

As shown in FIG. 4C, the accommodating part 12g is communicated with the anode gas inlet 12c and the anode gas outlet 12d. The accommodating part 12g accommodates the gas diffusion member 32. The gas diffusion member 32 diffuses the anode gas supplied from the anode gas inlet 12c. The gas diffusion member 32 has an overlapping part 32a which overlaps the catalyst layers 2b, 2c in a plan view, and the protruding part 32b which protrudes from the overlapping part 32a towards the anode gas inlet 12c and the anode gas outlet 12d. According to this configuration, the anode gas supplied from the anode gas inlet 12c is smoothly introduced into the gas diffusion member 32.

As shown in FIG. 5, the accommodating part 13g is communicated with the cooling water inlet 13e and the cooling water outlet 13f. The accommodating part 13g accommodates the cooling water diffusion member 33. The cooling water diffusion member 33 diffuses the cooling water supplied from the cooling water inlet 13e, and for example, is configured of a porous material. The cooling water diffusion member 33 has an overlapping part 33a which overlaps the catalyst layers 2b, 2c in a plan view, and the protruding part 33b which protrudes from the overlapping part 33a towards the cooling water inlet 13e and the cooling water outlet 13f. According to this configuration, the cooling water supplied from the cooling water inlet 13e is smoothly introduced into the cooling water diffusion member 33.

The cathode gas, anode gas, and cooling water are supplied through the cathode gas inlet 3a etc., the anode gas inlet 3c etc., and the cooling water inlet 3e etc., respectively. The cathode gas is supplied to the cathode gas diffusion member 31 and is not supplied to the anode gas diffusion member 32 and the cooling water diffusion member 33. The cathode gas supplied to the cathode gas diffusion member 31 is emitted through the cathode gas outlet 3*b* etc. The anode gas is supplied to the anode gas diffusion member 32 and is not supplied to the cathode gas diffusion member 31 and the cooling water diffusion member 33. The anode gas supplied to the anode gas diffusion member 32 is emitted through the anode gas outlet 3*d* etc. The cooling water is supplied to the cooling water diffusion member 33 and is not supplied to the cathode gas diffusion member 31 and the anode gas diffusion member 32. The cooling water supplied to the cooling water diffusion member 33 is emitted through the cooling water outlet 3*f* etc.

The separators 21 and 22 can be formed of metals such as titanium, stainless steel, or composites of a carbon material and a resin.

Figure 6A:
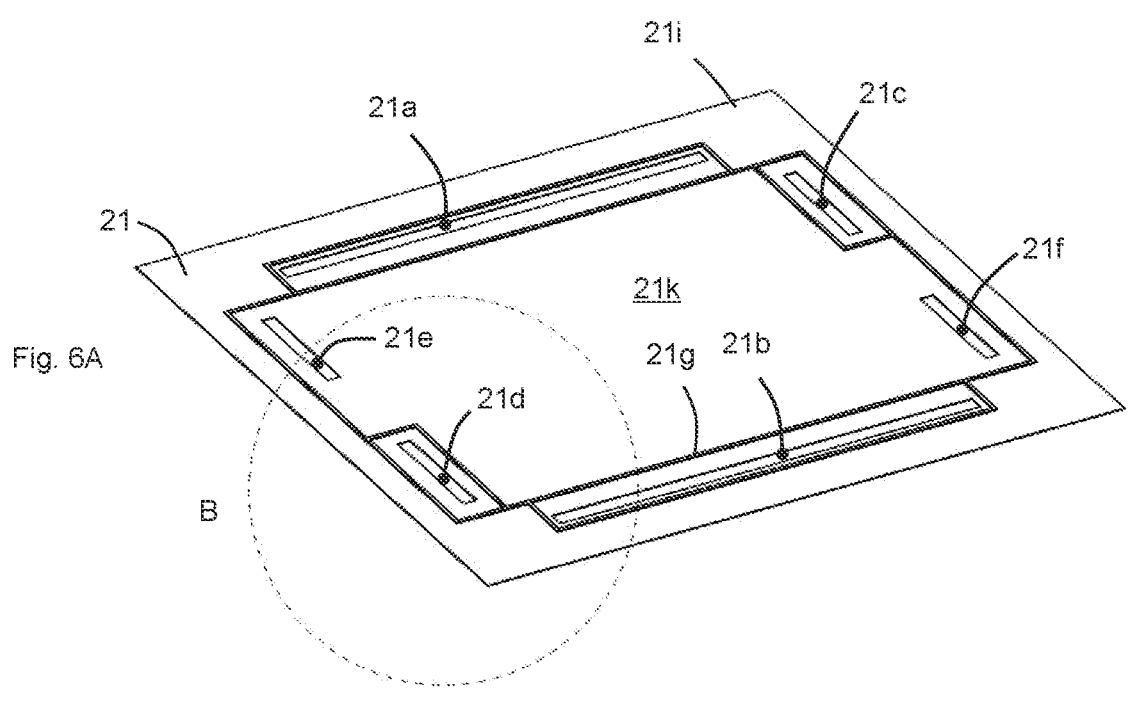
FIG. 6A is a perspective view of a cooling water side of a cooling water/cathode separator 21 as viewed from diagonally above.
Figure 6B:
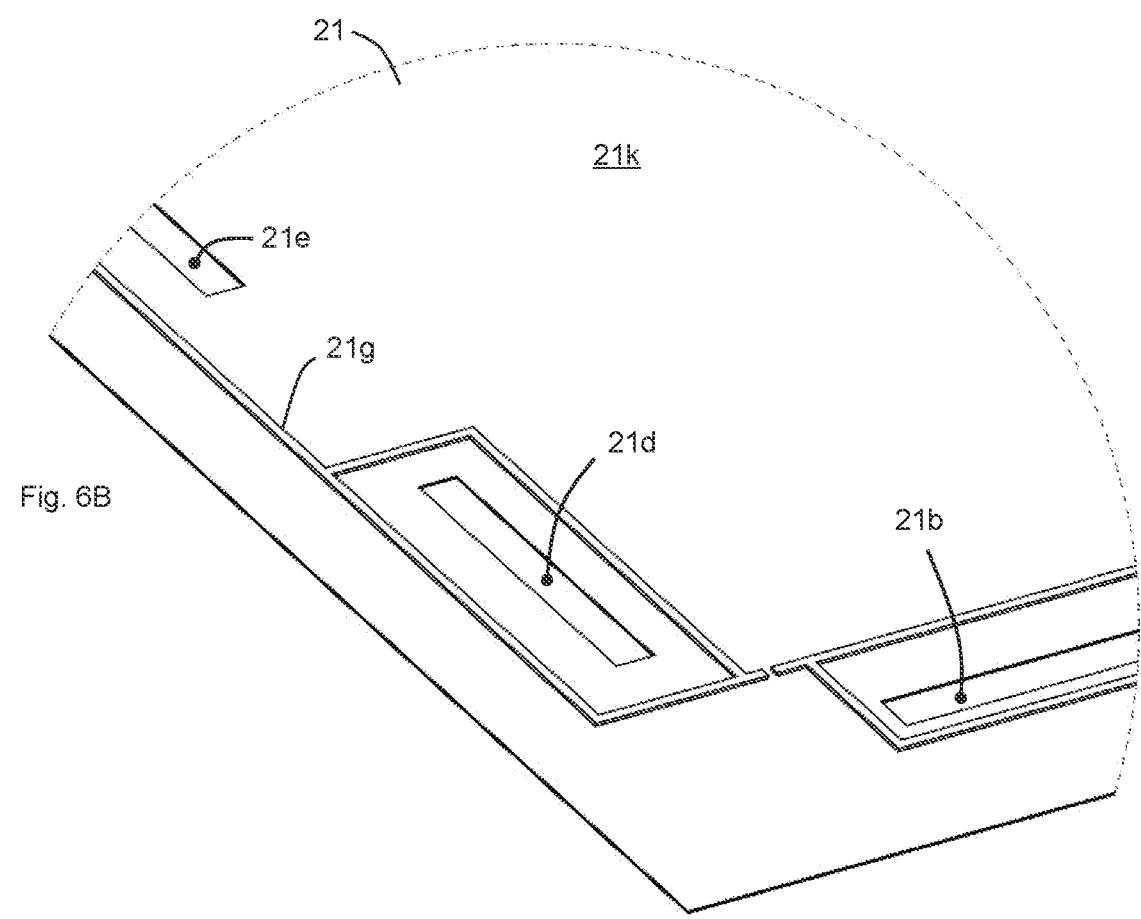
FIG. 6B is an enlarged view of an area B in FIG. 6A.
Figure 7A:
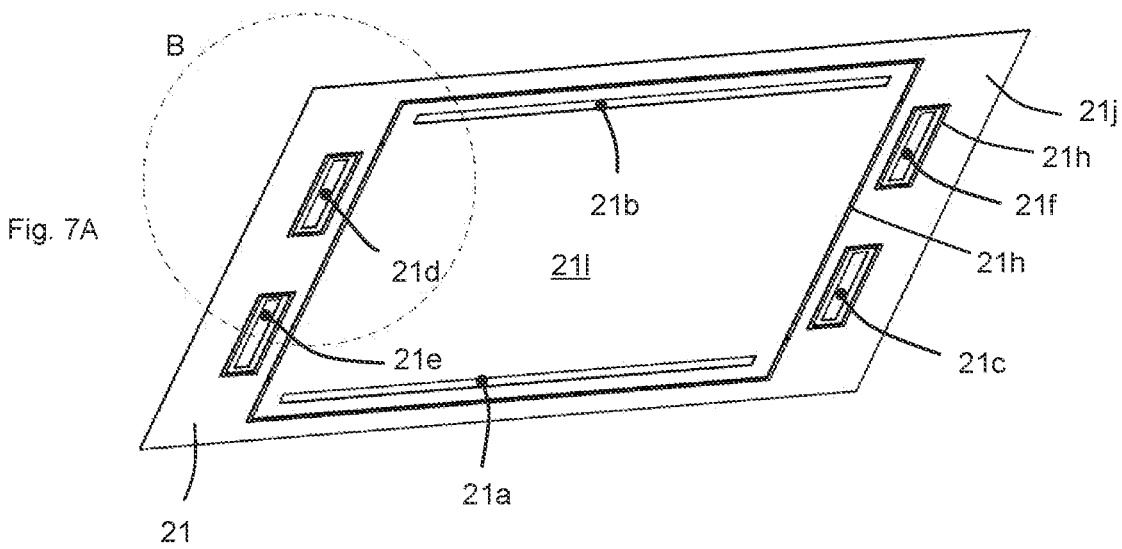
FIG. 7A is a perspective view of a cathode side of the cooling water/cathode separator 21 as viewed from diagonally below.
Figure 7B:
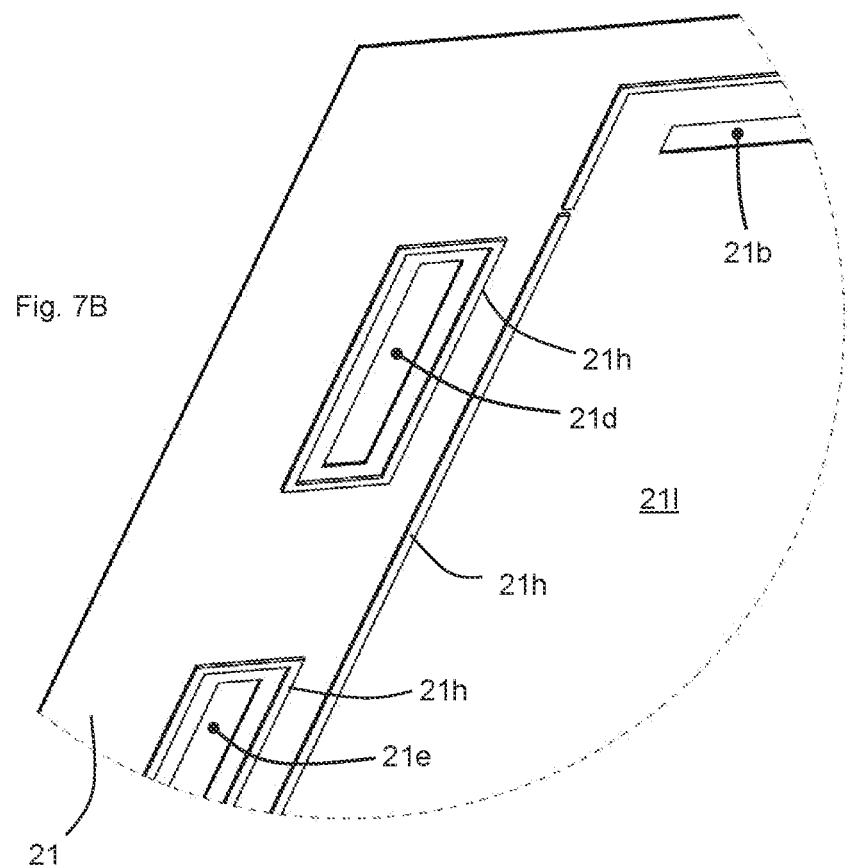
FIG. 7B is an enlarged view of an area B in FIG. 7A.

As shown in FIGS. 6 to 7, the separator 21 is a flat plate member having first and second principal surfaces 21*i*, 21*j*. The principal surface 21*i* is provided with a ridge 21*g*, and the principal surface 21*j* is provided with a ridge 21*h*.

As shown in FIG. 1, the ridge 21*g* faces the gasket 13, and the ridge 21*g* is pressed against the gasket 13 to form the sealing structure. The ridge 21*g* is provided to form a passage 21*k* that allows the cooling water to flow along the principal surface 21*i*.

As shown in FIG. 2, the ridge 21*h* faces the gasket 11, and the ridge 21*h* is pressed against the gasket 11 to form the sealing structure. The ridge 21*h* is provided to form a passage 21*i* that allows the cathode gas to flow along the main surface 21*j*.

Figure 8A:
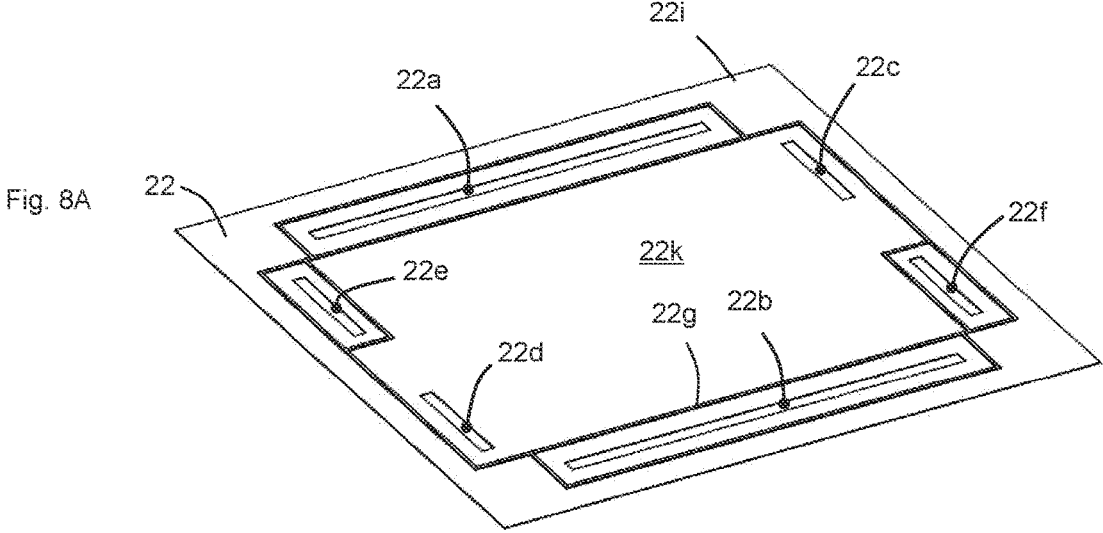
FIG. 8A is a perspective view of an anode side of an anode/cooling water separator 22 as viewed from diagonally above.
Figure 8B:
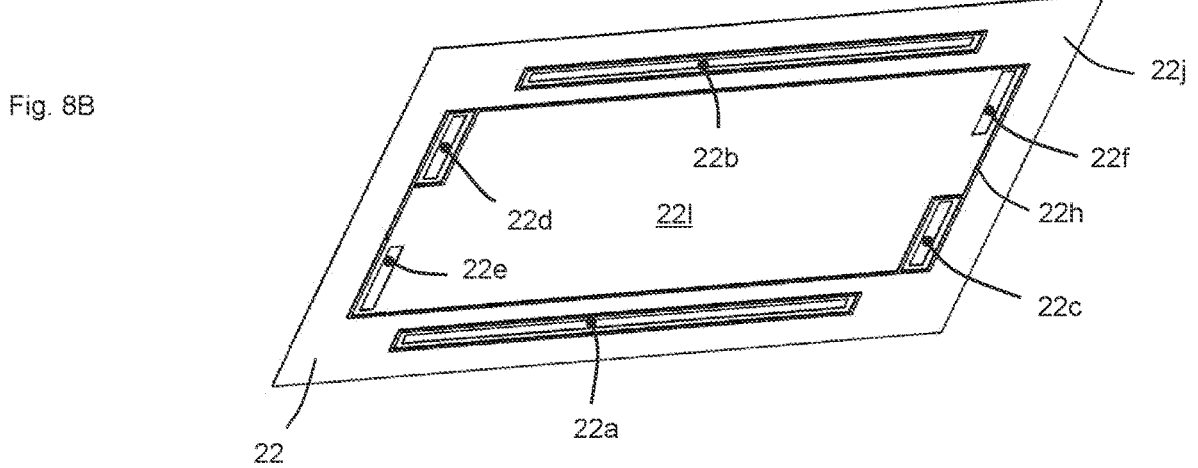
FIG. 8B is a perspective view of a cooling water side of the anode/cooling water separator 22 as viewed from diagonally below.

As shown in FIG. 8, the separator 22 is a flat plate member having first and second principal surfaces 22*i* and 22*j*. The principal surface 22*i* is provided with a ridge 22*g*, and the principal surface 22*j* is provided with a ridge 22*h*. The configuration, manufacturing method and the like of the separator 22 are the same as those of the separator 21.

As shown in FIG. 1, the ridge 22*g* faces the gasket 12, and the ridge 22*g* is pressed against the gasket 12 to form the sealing structure. The ridge 22*g* is provided to form the passage 22*k* that allows the anode gas to flow along the main surface 22*i*.

As shown in FIG. 2, the ridge 22*h* faces the gasket 13, and the ridge 22*h* is pressed against the gasket 13 to form the sealing structure. The ridge 22*h* is provided to form a passage 22*l* that allows the cooling water to flow along the principal surface 22*j*.

The gas diffusion member 31 will hereinafter be described in more detail.

Figure 9A:
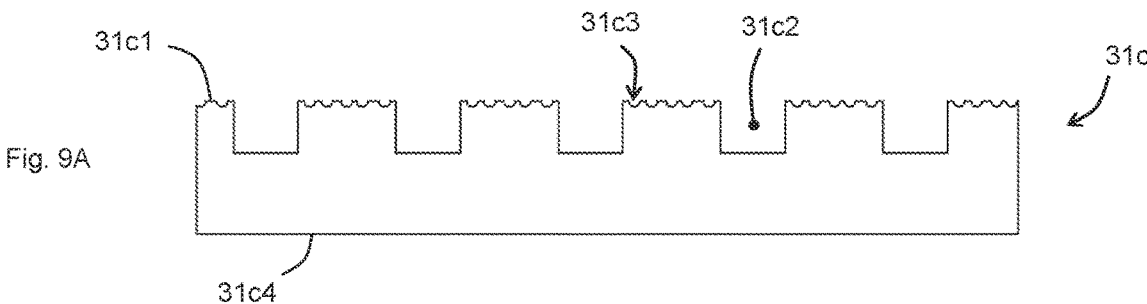
FIG. 9A is a schematic view showing the cross-sectional shape of a porous material layer 31c.
Figure 9B:
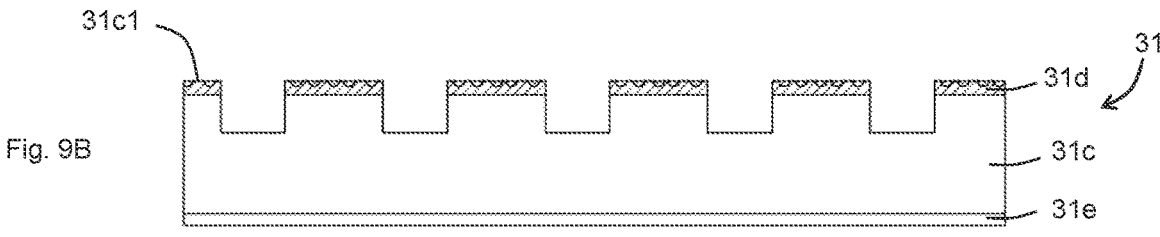
FIG. 9B is a schematic view showing the cross-sectional shape of the gas diffusion member 31.

As shown in FIG. 9B, the gas diffusion member 31 comprises a porous material layer 31*c*, a conductive material layer 31*d*, and a microporous layer 31*e*.

The porous material layer 31*c* is configured of a conductive porous material. The porous material layer 31*c* preferably includes a mixture of a conductive filler and a resin. Binding property of the resin facilitates the formation of grooves 31*c*2 (illustrated in FIG. 9A), which is described later. The conductive filler can be either particulate or fibrous, but in terms of increasing porosity, it is preferably fibrous. The conductive filler is preferably a carbon filler in terms of conductivity. Therefore, the conductive filler is preferably a carbon fiber. The percentage of the conductive filler in the mixture is preferably 70 to 99 mass %, more preferably 80 to 90 mass %. This percentage is, particularly for example, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 mass %, and can be in the range between the two values exemplified herein. The resin preferably does not soften at the operating temperature of the fuel cell, and is preferably thermoplastic resin.

The porous material layer 31*c* may also be made of base materials including a conductive and porous sheet-shaped material or the like such as woven fabric of conductive fiber (e.g., carbon fiber), paper body, felt, and nonwoven fabric. More specifically, carbon paper, carbon cloth, and carbon nonwoven fabric are preferably cited as examples of the layer.

Porosity of the porous material layer 31*c* is preferably 30 to 85%, more preferably 50 to 85%. Porosity is defined as (the volume of pores in the porous material layer)/(the volume of the porous material layer). The porosity is, particularly for example, 30, 35, 40, 45, 50, 55, 60, 65, 70, 75, 80, or 85%, and can be in the range between the two values exemplified herein.

The thickness of the porous material layer 31*c* is, for example, 0.1 to 1 mm, preferably 0.2 to 0.6 mm. The thickness of the porous material layer 31*c* is, particularly for example, 0.1, 0.2, 0.3, 0.4, 0.5, 0.6, 0.7, 0.8, 0.9, or 1.0 mm, and can be in the range between the two values exemplified herein.

As shown in FIG. 9A, a surface 31*c*1 on the separator 21 side of the porous material layer 31*c* is preferably provided with the groove 31*c*2 as a gas flow path. The uniformity of gas diffusion can be enhanced by providing the groove 31*c*2. The ratio of the depth of the groove 31*c*2 to the thickness of the porous material layer 31*c* is, for example, 0.1 to 0.9 and preferably 0.1 to 0.7. The ratio of the width of the groove 31*c*2 to the thickness of the porous material layer 31*c* is, for example, 0.1 to 0.9 and preferably 0.1 to 0.7. These ratios are, particularly for example, 0.1, 0.2, 0.3, 0.4, 0.5, 0.6, 0.7, 0.8, or 0.9, and can be in the range between the two values exemplified herein. The depth and/or width of the groove 31*c*2 may be constant or variable along the direction in which the groove 31*c*2 extends. The shape of the groove 31*c*2 can be, for example, zigzag, sinusoidal, square wave, or lattice. The number of the groove 31*c*2 may be one or more. The groove 31*c*2 may be provided to extend continuously from the end surface on the cathode gas inlet 3*a* side to the end surface on the cathode gas outlet 3*b* side and may also be provided in a part of the region in between.

The surface 31*c*1 of the porous material layer 31*c* on the separator 21 side has many recesses 31*c*3 relating to the pores in the porous material. For this reason, if the porous material layer 31*c* is in direct contact with the separator 21, the contact surface area becomes smaller by the amount of the recesses 31*c*3, thereby increasing the contact resistance between the porous material layer 31*c* and the separator 21.

Therefore, in the present embodiment, the conductive material layer 31*d* is placed on the surface 31*c*1 of the porous material layer 31*c* on the separator 21 side. The conductive material layer 31*d* is constituted of a conductive material and is provided so that the pores of the porous material that constitutes the porous material layer 31*c* (in other words, the recesses 31*c*3 relating to the pores of the porous material) are filled with the conductive material. Consequently, as shown in FIG. 9B, the surface 31*c*1 is planarized, thereby reducing the contact resistance between the porous material layer 31*c* and the separator 21.

The porosity of the conductive material layer 31*d* is lower than that of the portion of the porous material layer 31*c* other than the conductive material layer 31*d*, and is, for example, 0 to 20% and preferably 0 to 10%. This porosity is, particularly for example, 0, 1, 2, 3, 4, 5, 6, 7, 8, 9, 10, 11, 12, 13, 14, 15, 16, 17, 18, 19, or 20%, and can be in the range between the two values exemplified herein.

The thickness of the conductive material layer $31d$ is, for example, 1 to 100 μm, preferably 1 to 60 μm, and further preferably 5 to 30 μm. If the conductive material layer $31d$ is too thin, the contact resistance reduction effect may be insufficient, and if it is too thick, gas diffusion may be inhibited. The thickness of conductive material layer $31d$ is, particularly for example, 1, 5, 10, 15, 20, 25, 30, 35, 40, 45, 50, 55, 60, 70, 80, 90, or 100 μm, and can be in the range between the two values exemplified herein.

Defining that the thickness of the part of the conductive material layer $31d$ formed inside the porous material layer $31c$ is T1 and the thickness of the part formed outside the porous material layer $31c$ is T2, the value of T2/T1 is preferably 0.5 or less, more preferably 0.3 or less, and even more preferably 0.1 or less. This is because if T2 is large, the resistance of the conductive material layer $31d$ may lead to the increased internal resistance. The value of T2/T1 is, particularly for example, 0, 0.01, 0.05, 0.1, 0.2, 0.3, 0.4, or 0.5, and can be in the range between the two values exemplified herein.

Figure 9C:
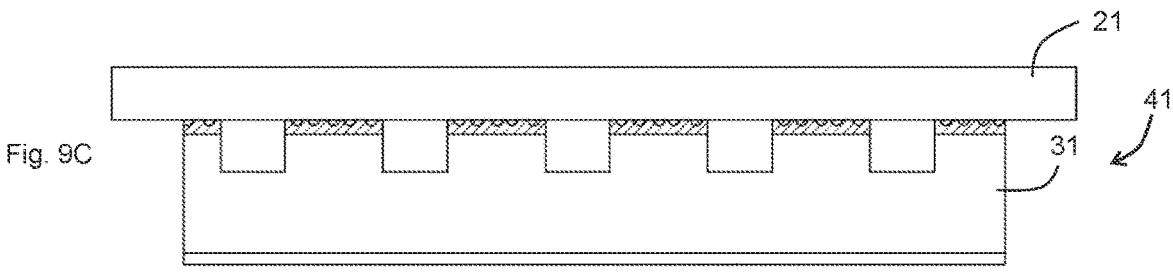
FIG. 9C is a schematic view showing the cross-sectional shape of a gas diffusion unit 41.

The conductive material layer $31d$ can be formed by applying the conductive material to the surface $31c1$ of the porous material layer $31c$ and curing it. It is preferable to press the flat surface of the separator 21 or another member against the surface of the porous material layer $31c$ in curing the conductive material. This can flatten the surface of the conductive material layer $31d$ If the conductive material is an adhesive material, a cathode gas diffusion unit 41, which is unitized by adhering the separator 21 to the gas diffusion member 31 via the conductive material, can be obtained, as shown in FIG. 9C, by pressing the separator 21 against the surface $31c1$ of the porous material layer $31c$ after the application of the conductive material and by curing the conductive material under such a condition. Adhesion of the separator 21 to the gas diffusion member 31 can reduce the contact resistance drastically as well as the number of components of the fuel cell, thereby reducing time required for the assembly step. The gasket 11 can be fixed to the separator 21 of the gas diffusion unit 41, thereby further reducing the number of components.

The conductive material has conductivity and can fill the pores of the porous material constituting the porous material layer $31c$. For example, the conductive material is formed of a resin in which conductive particles are dispersed. The diameter of the conductive particles is preferably ½ or less of the pore diameter of the porous material. This is because the pores of the porous material can be easily filled with the conductive particles in this case. It is preferable that the resin can be cured after the conductive material is applied to the porous material layer $31c$. The curing method may be heat curing, light curing, or room temperature curing. When the gas diffusion unit is obtained by adhering the separator 21 to the gas diffusion member 31 via the conductive material, it is preferable to cure the resin at a temperature of 100° C. or lower. If the curing temperature is too high, the gas diffusion unit may be warped due to the difference in linear expansion coefficient between the gas member 31 and the separator 21. The curing temperature is, for example, 0 to 100° C., and particularly for example, 0, 10, 20, 30, 40, 50, 60, 70, 80, 90, or 100° C., and can be in the range between the two values exemplified herein. The conductive particles are preferably carbon particles and more preferably carbon black, in terms of conductivity and availability.

The conductive material may also be constituted of conductive polymers. In this case, the addition of the conductive particles is not necessary.

The microporous layer $31e$ is provided on a surface $31c4$ on the catalyst layer $2b$ side of the porous material layer $31c$. The microporous layer $31e$ has conductivity and finer pores than those of the porous material layer $31c$. The microporous layer $31e$ facilitates the removal of water generated by the reaction in the catalyst layer $2b$. The microporous layer $31e$ has higher permeability than the conductive material layer $31d$. The permeability can be measured in accordance with JIS P 8117:2009. The porosity of the microporous layer $31e$ is preferably higher than that of the conductive material layer $31d$. The microporous layer $31e$ preferably contains a mixture of the conductive filler and the resin. The permeability and porosity of the microporous layer $31e$ can be adjusted by varying the proportion of the resin in the mixture or the size of the conductive filler. The microporous layer $31e$ can be omitted if it is not needed.

The gas diffusion member 32 can be constituted in the same way as the gas diffusion member 31. The contact resistance between the gas diffusion member 32 and the separator 22 can be reduced by providing a conductive material layer in the gas diffusion member 32. Further, the gas diffusion member 32 may be adhered to the separator 22 via the conductive material to obtain an anode gas diffusion unit. The gasket 12 may be fixed to the separator 22 of the anode gas diffusion unit.

2. Other Embodiments

In the first embodiment, the cooling layer 5 is provided for each single cell 4, but the cooling layer 5 may be provided for each of a plurality of single cells 4. In this case, an anode/cathode separator is provided between two single cells 4. Since the gas diffusion members 31, 32 are brought into contact with the anode-cathode separator, the contact resistance can be reduced by the same configuration as in the first embodiment. The anode/cathode separator is a cathode-side separator when viewed from the gas diffusion member 31 side and is an anode-side separator when viewed from the gas diffusion member 32 side.

In the above embodiment, the sealing structure is realized by pressing the ridge provided on the separator against the gasket, but the sealing structure may be realized by other methods. For example, the sealing structure may be realized by placing the gasket (sealing material such as packing, O-ring, or the like) inside a groove provided on the separator.

EXPLANATION OF SYMBOLS

1: fuel cell, 2: catalyst-coated membrane, $2a$: electrolyte membrane, $2b$: cathode catalyst layer, $2c$: anode catalyst layer, $2d$: periphery, 3: support frame, $3a$: cathode gas inlet, $3b$: cathode gas outlet, $3c$: anode gas inlet, $3d$: anode gas outlet, $3e$: cooling water inlet, $3f$: cooling water outlet, 4: single cell, 5: cooling layer, 11: cathode gasket, $11a$: cathode gas inlet, $11b$: cathode gas outlet, $11c$: anode gas inlet, $11d$: anode gas outlet, $11e$: cooling water inlet, $11f$: cooling water outlet, $11g$: accommodating part, 12: anode gasket, $12a$: cathode gas inlet, $12b$: cathode gas outlet, $12c$: anode gas inlet, $12d$: anode gas outlet, $12e$: cooling water inlet, $12f$: cooling water outlet, $12g$: accommodating part, 13: cooling water gasket, $13a$: cathode gas inlet, $13b$: cathode gas outlet, $13c$: anode gas inlet, $13d$: anode gas outlet, $13e$: cooling water inlet, $13f$: cooling water outlet, $13g$: accommodating part, 21: cathode separator, 21*a*: cathode gas inlet, 21*b*: cathode gas outlet, 21*c*: anode gas inlet, 21*d*: anode gas outlet, 21*e*: cooling water inlet, 21*f*: cooling water outlet, 21*g*: ridge, 21*h*: ridge, 21*i*: first principal surface, 21*j*: second principal surface, 21*k*: passage, 21*l*: passage, 22: cooling water separator, 22*a*: cathode gas inlet, 22*b*: cathode gas outlet, 22*c*: anode gas inlet, 22*d*: anode gas outlet, 22*e*: cooling water inlet, 22*f*: cooling water outlet, 22*g*: ridge, 22*h*: ridge, 22*i*: first principal surface, 22*j*: second principal surface, 22*k*: passage, 22*i*: passage, 31: cathode gas diffusion member, 31*a*: overlapping part, 31*b*: protruding part, 31*c*: porous material layer, 31*c*1: surface, 31*c*2: groove, 31*c*3: recess, 31*c*4: surface, 31*d*: conductive material layer, 31*e*: microporous layer, 32: anode gas diffusion member, 32*a*: overlapping part, 32*b*: protruding part, 33: cooling water diffusion member, 33*a*: overlapping part, 33*b*: ridge, 41: cathode gas diffusion unit, B: area, C: area

The invention claimed is:

1. A gas diffusion unit comprising a gas diffusion member and a separator, wherein the gas diffusion member is adapted to be arranged between the separator and a catalyst layer of a fuel cell, the gas diffusion member comprising:

a porous material layer; and a conductive material layer, wherein:

the porous material layer is formed of a conductive porous material;

the conductive material layer is formed of a conductive material;

the conductive material layer is arranged on a surface of the porous material layer on a side of the separator and is provided so that pores of the porous material are filled with the conductive material;

the gas diffusion member is adhered to the separator via the conductive material; and a thickness of a part of the conductive material layer formed inside the porous material layer is defined as T1 and the thickness of the part formed outside the porous material layer is defined as T2, and a value T2/T1 is 0.5 or less.

2. The gas diffusion unit of claim 1, wherein the porous material layer comprises a groove on the surface on the side of the separator as a gas flow path.

3. The gas diffusion unit of claim 1, wherein a microporous layer is provided on a surface of the porous material layer on a side of the catalyst layer.

4. The gas diffusion unit of claim 1, wherein the conductive material is formed of a resin in which conductive particles are dispersed.

5. The gas diffusion unit of claim 1, wherein a thickness of the conductive material layer is 1 to 100 μm.

6. The gas diffusion unit of claim 1, wherein a gasket arranged to surround the gas diffusion member is fixed to the separator.

7. A fuel cell, comprising:

a cathode gas diffusion unit, a catalyst-coated membrane, and an anode gas diffusion unit in this order;

wherein:

the catalyst-coated membrane comprises a cathode catalyst layer, an electrolyte membrane and an anode catalyst layer in order from a side of the cathode gas diffusion unit; and the cathode gas diffusion unit and the anode gas diffusion unit are each the gas diffusion unit of claim 1.

8. The fuel cell of claim 7, wherein:

a cathode gasket arranged to surround the cathode gas diffusion member of the cathode gas diffusion unit is fixed to the separator of the cathode gas diffusion unit; and an anode gasket arranged to surround the anode gas diffusion member of the anode gas diffusion unit is fixed to the separator of the anode gas diffusion unit.

* * * * *